(12) United States Patent
Hull et al.

(10) Patent No.: US 11,794,352 B2
(45) Date of Patent: Oct. 24, 2023

(54) BORE METROLOGY METHODS AND SYSTEMS, AND BORE LOCATING TARGET ASSEMBLIES FOR USE THEREWITH

(71) Applicant: The Boeing Company, Chicago, IL (US)

(72) Inventors: Jerald A. Hull, Charleston, SC (US); Branko Lakic, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 159 days.

(21) Appl. No.: 17/541,556

(22) Filed: Dec. 3, 2021

(65) Prior Publication Data

US 2022/0212347 A1    Jul. 7, 2022

Related U.S. Application Data

(60) Provisional application No. 63/133,465, filed on Jan. 4, 2021.

(51) Int. Cl.
| | |
|---|---|
| *G06K 7/10* | (2006.01) |
| *B25J 9/16* | (2006.01) |
| *B25J 19/02* | (2006.01) |
| *B25J 11/00* | (2006.01) |

(52) U.S. Cl.
CPC .......... *B25J 9/1697* (2013.01); *B25J 11/005* (2013.01); *B25J 19/023* (2013.01); *G06K 7/10722* (2013.01)

(58) Field of Classification Search
CPC .............................. B25J 9/1697; B25J 19/023
USPC ....................................................... 235/462.11
See application file for complete search history.

(56) References Cited

U.S. PATENT DOCUMENTS

| | | | |
|---|---|---|---|
| 2005/0198750 A1* | 9/2005 | Spencer ................ | B64F 1/3055 14/71.5 |
| 2016/0318144 A1 | 11/2016 | Hull et al. | |
| 2017/0210011 A1 | 7/2017 | Hull | |
| 2017/0282369 A1 | 10/2017 | Hull | |
| 2018/0208328 A1 | 7/2018 | Charlton et al. | |
| 2019/0003823 A1 | 1/2019 | Hull | |
| 2021/0323163 A1* | 10/2021 | Halvorsen ............ | G05B 19/404 |

* cited by examiner

*Primary Examiner* — Toan C Ly
(74) *Attorney, Agent, or Firm* — Walters & Wasylyna LLC

(57) ABSTRACT

A bore metrology method includes aligning a first structure, which defines an initial bore, with a second structure, which defines a pilot bore, such that the initial bore is partially obstructed by the second structure and the pilot bore is superimposed with the initial bore. The initial bore includes a bore locating target assembly within the initial bore, the bore locating target assembly having an optical target, the optical target having a reflector and an optical absorbing feature, the optical absorbing feature defining a pattern on the optical target. At least a portion of the reflector and at least a portion of the pattern are visible through the pilot bore. The method further includes imaging the portion of the reflector and the portion of the pattern that are visible through the pilot bore. The method further includes determining a centerline of the initial bore based on the imaging.

20 Claims, 12 Drawing Sheets

BORE METROLOGY METHODS AND SYSTEMS, AND BORE LOCATING TARGET ASSEMBLIES FOR USE THEREWITH

PRIORITY

This application claims priority from U.S. Ser. No. 63/133,465 filed on Jan. 4, 2021.

FIELD

This application relates to bore metrology and, more particularly, to apparatus, systems and methods for determining a centerline of a partially obstructed bore and, even more particularly, to apparatus, systems and methods for match drilling a bore in a second structure that obstructs an initial bore in a first structure.

BACKGROUND

Manufacturing, and particularly precision manufacturing required for industries such as the aerospace industry, requires accurate locating of workpieces, fixtures, and tools to perform various manufacturing operations and processes. Increasingly, robots are used to perform manufacturing functions that previously required manual alignment operations. However, the accuracy of the robotic work operation relies on an understanding of the location of workpieces relative to the robot and its associated tool or tools.

Orientation and alignment of a robot and a workpiece may conventionally be performed via coordinate measurement such as using a coordinate measuring machine or function of a robot. A tool may be aligned by a robot operator using a tool mounted camera to locate a particular feature, such as a hole or fiducial mark. Customarily, the camera is very slowly positioned close to the workpiece using numerically controlled program commands aided by manual intervention in order to accurately register a small feature against a cluttered background. However, the robotic arm on which the camera is located must be prevented from inadvertently contacting the workpiece or risk damage to any or all of the camera, the robotic arm, or the workpiece. This close proximity placement may involve the use of mechanical feelers or optical sensors, and time consuming visual inspection by the operator. When enough features have been semi-autonomously identified to derive the workpiece coordinate system in three dimensions of rotation and translation, the workpiece can be registered to the coordinate system of the robot and the operator can begin a fully autonomous robotic assembly operation, such as cutting, drilling, fastening, or welding. The semi-autonomous alignment operations described above are labor intensive and can add considerable time to the manufacturing operations cycle. Further, difficulties arise when match drilling two or more workpieces. The slight offset of the two workpieces may be problematic when both workpieces need to be robotically match drilled to a high accuracy from the inner side.

Accordingly, a need exists to accurately align and reposition workpieces during various manufacturing operations including those involving match drilling.

SUMMARY

Disclosed is a bore metrology method.

In one example, a bore metrology method includes aligning a first structure, which defines an initial bore, with a second structure, which defines a pilot bore, such that the initial bore is partially obstructed by the second structure and the pilot bore is superimposed with the initial bore. The initial bore includes a bore locating target assembly within the initial bore, the bore locating target assembly having an optical target, the optical target having a reflector and an optical absorbing feature, the optical absorbing feature defining a pattern on the optical target. At least a portion of the reflector and at least a portion of the pattern are visible through the pilot bore. The method further includes imaging the portion of the reflector and the portion of the pattern that are visible through the pilot bore. The method further includes determining a centerline of the initial bore based on the imaging.

Also disclosed is a bore metrology system.

In an example, the bore metrology system includes a bore locating target assembly positionable within an initial bore defined in a first structure. The initial bore is partially obstructed by a second structure defining a pilot bore such that the pilot bore is superimposed with the initial bore. The bore locating target assembly includes an optical target, the optical target includes a reflector and an optical absorbing feature such that the optical absorbing feature defines a pattern on the optical target. The bore metrology system further includes an automated machine including an end effector. The bore metrology system further includes a camera system mounted on the end effector, the camera system being configured to project a collimated beam of electromagnetic radiation within a field of view. In an example, the automated machine is configured to position the end effector such that the pilot bore is within the field of view.

Also disclosed is a bore locating target assembly.

In an example, a bore locating target assembly includes a self-centering insert defining a self-centering insert centerline and having a distal end and a proximal end. The bore locating target assembly further includes an optical target connected proximate the distal end of the self-centering insert such that the optical target includes a reflector and an optical absorbing feature. The optical absorbing feature defines a pattern on the optical target.

Other examples of the disclosed bore metrology methods and systems, and bore locating target assemblies for use therewith will become apparent from the following detailed description, the accompanying drawings, and the appended claims.

BRIEF DESCRIPTION OF THE DRAWINGS

Some examples of the present disclosure are described with reference to the accompanying drawings. The same reference number represents the same element or the same type of element on all drawings.

DETAILED DESCRIPTION

Figure 1:
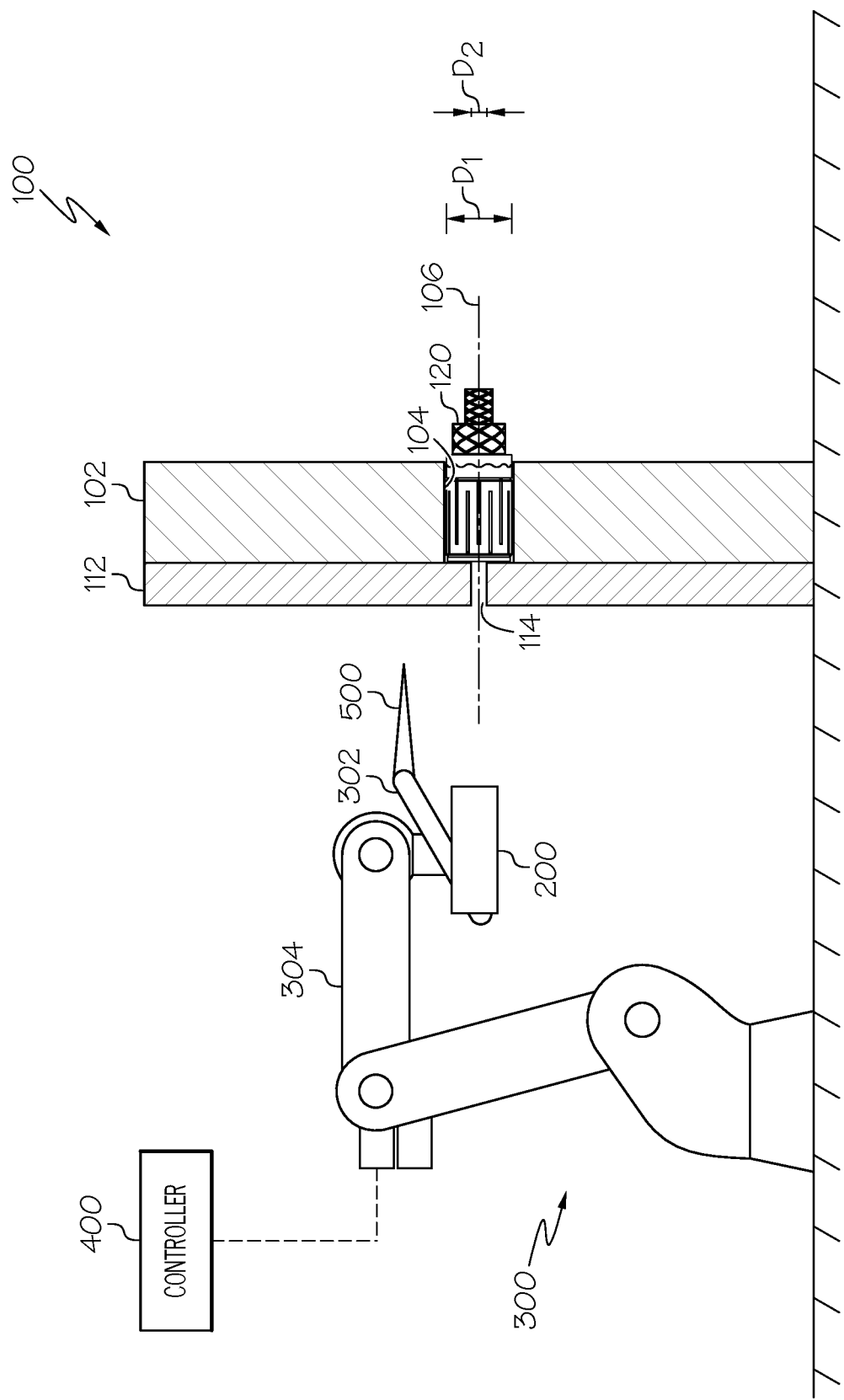
FIG. 1 is a side schematic view, partially in section, of one example of the disclosed bore metrology system 100.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about," "approximately," "substantially," and "generally" refer to or represent a condition that is close to, but not exactly, the stated condition that still performs the desired function or achieves the desired result. As an example, the terms "about," "approximately," "substantially," and "generally" refer to a condition that is within an acceptable predetermined tolerance or accuracy. For example, the terms "about," "approximately," "substantially," and "generally" refer to a condition that is within 10% of the stated condition. However, the terms "about," "approximately," "substantially," and "generally" do not exclude a condition that is exactly the stated condition.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The disclosed methods, systems, and apparatuses address problems of existing methods for joining two indexed workpieces. An exemplary scenario involves a manufacturing condition requiring the coupling or joining of two or more indexed workpieces. In this example, the outer workpiece may have existing, full-size holes. The workpieces may be aligned such that the existing full-size holes may be obscured by an inner workpiece. The slight offset of the two workpieces may be problematic when both workpieces need to be robotically match drilled to a high accuracy from the inner side. Disclosed herein is in a bore metrology method 10 addressing the above-mentioned problems with aligning two workpieces. Further disclosed is an apparatus and system configured to project and analyze a reticle pattern to facilitate alignment of the two workpieces and match drilling of the workpieces.

The disclosed methods, systems, and apparatuses related to a pilot hole aligning specular reticle enable high operational efficiency machining by providing optically acquired high accuracy measurements. When observed by an active optical measurement system co-aligned with a machining spindle on a robotic end effector, each pilot hole aligning specular reticle can be measured in milliseconds at a few inches standoff distance, followed immediately by the objective matched hole machining.

The disclosed further enable camera systems the ability to measure a hole centerline, representing four orthogonal degrees of freedom requiring the most challenging accuracies with respect to the machine axis spindle. These four orthogonal degrees of freedom include the lateral and vertical translational axes, and the angles about these two translational axes. A required range measurement can be provided with various known methods.

The disclosed systems, methods, and apparatuses further enable inexpensive robotic manipulators. When hosted on an end effector with high precision staging, mounted to a robotic manipulator with stiff brakes, the disclosed pilot hole aligning specular reticle enables the robotic manipulator to be low accuracy, and therefore lower cost.

The disclosed pilot hole aligning specular reticle can be scaled so as to accommodate small to large holes. The reticle's specular facets are large enough to result in an extended object image, yet small enough to allow the two dimensional reticle pattern to fit within holes at least as small as 0.375" diameter, and likely much smaller.

Pilot holes can be very small, thereby enabling more alignment variation between the two workpieces. As measured by an afocal active imager akin to a camera system, the pilot hole aligning specular reticle pilot hole diameter is scaled as a few dozen camera pixels. With an exemplary pixel pitch on the order of 3.5 microns, a pilot hole diameter could be about 0.035 inches or smaller. Pilot holes are cone shaped a couple degrees to enable respective unobstructed off-axis specular reflections to and from the active imaging camera.

Pilot hole aligning specular reticles may be manufactured at various price points including those that are essentially expendable and inexpensive. Fabricated from an optically stable plastic such as polycarbonate, pilot hole aligning specular reticles can be inexpensively mass produced akin to compact disc or digital video disc.

Pilot hole aligning specular reticles can protect existing, full-size holes from moisture absorption during workpiece transportation and storage. Pilot hole aligning specular reticle can be kinematically mounted to self-centering bushings and inserted into full size holes. These bushings can incorporate environmental ingress protection provisions, moister getters, etc.

Figure 2:
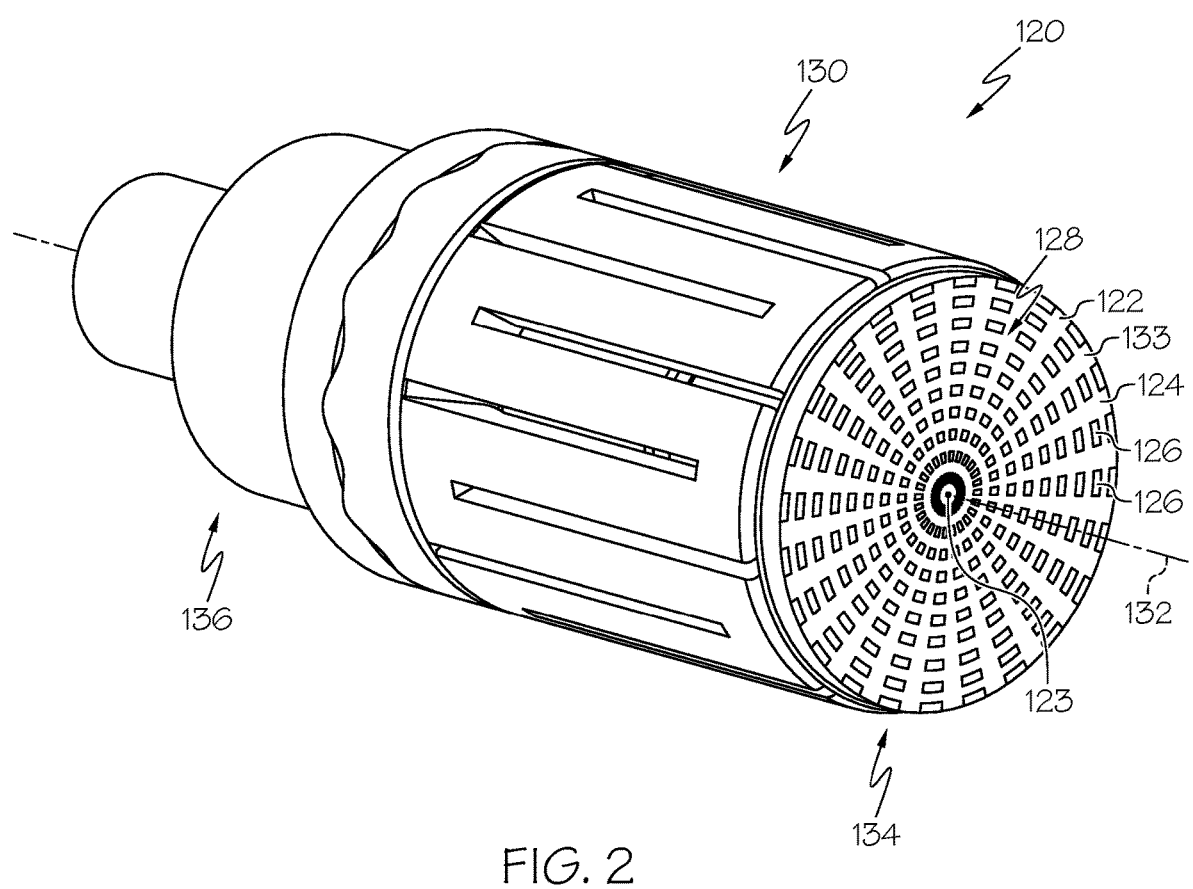
FIG. 2 is a front perspective view of the bore locating target assembly used in the system of FIG. 1.
Figure 3:
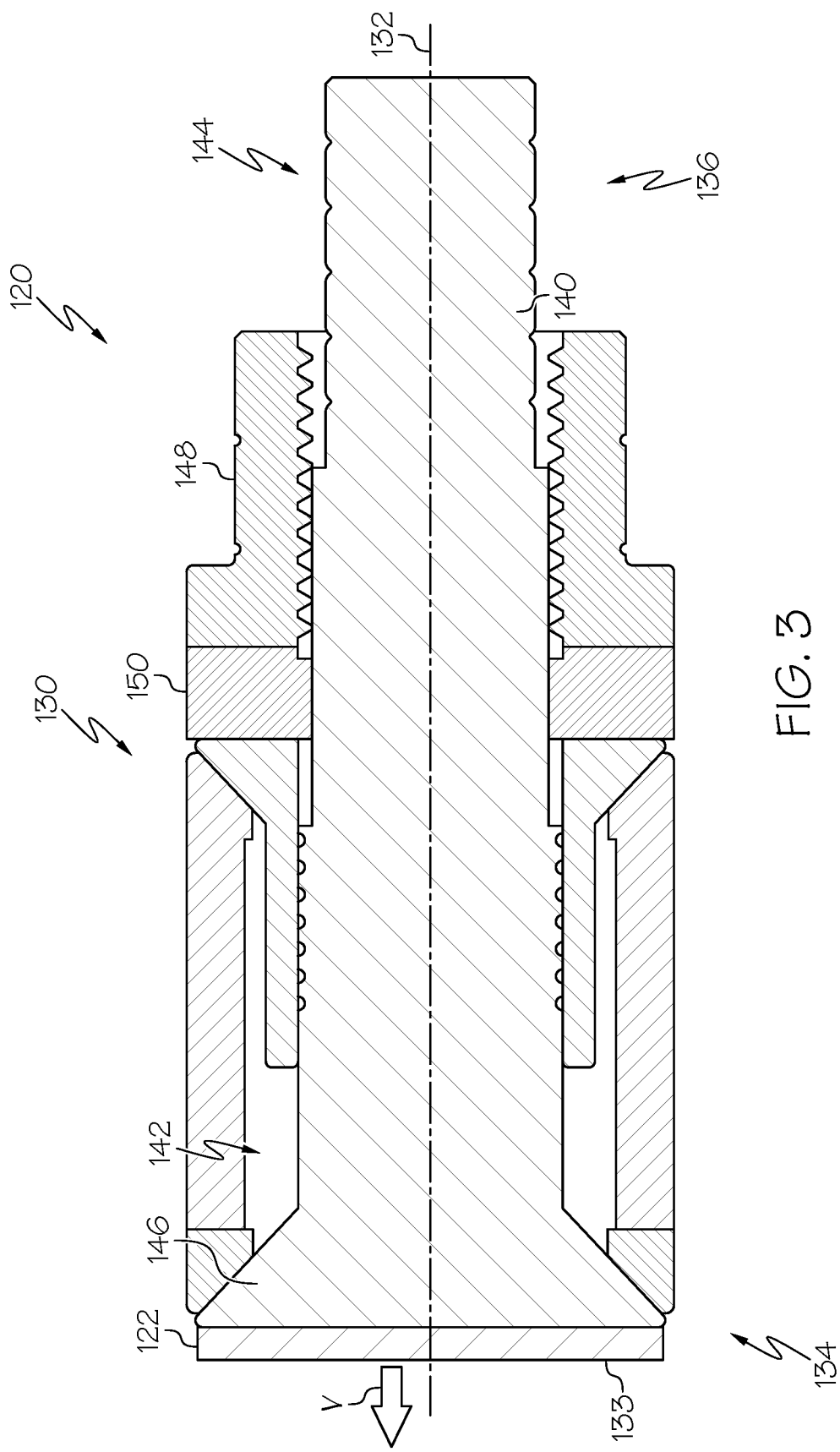
FIG. 3 is a side view, in cross-section, of the bore locating target assembly of FIG. 2.

FIG. 1 is a side schematic view, partially in section, of one example of the disclosed bore metrology system. In an example, the bore metrology system 100 includes a bore locating target assembly 120 positionable within an initial bore 104 defined in a first structure 102. For example, the initial bore 104 may be cylindrical bore. FIG. 2 illustrates a front perspective view and FIG. 3 illustrates a side view, in cross-section, of the bore locating target assembly 120 used in the system of FIG. 1. As shown in FIG. 1, the initial bore 104 is partially obstructed by a second structure 112. Second structure 112 may define a pilot bore 114. The pilot bore 114 may be superimposed with the initial bore 104. In an example, the bore locating target assembly 120 includes an optical target 122 wherein the optical target 122 includes a reflector 124 and an optical absorbing feature 126. The reflector 124 may include a silver coated flat surface. The optical absorbing feature 126 may define a pattern 128 on the optical target 122. In an example, the absorbing feature includes one or more of an etch, an ink, and a carbon-containing compound, or any combination thereof. The pattern 128 may be a polar reticle, for example.

The bore metrology system 100 further includes an automated machine 300 having an end effector 302. Automated machine 300 may be in communication with a controller 400. Controller 400 may utilize one or more numerical control programs for collection of data and analysis thereof. The automated machine 300 may be configured to position the end effector 302 such that the pilot bore 114 is within the field of view 202. In an example, the automated machine 300 includes a robotic arm 304.

Figure 8:
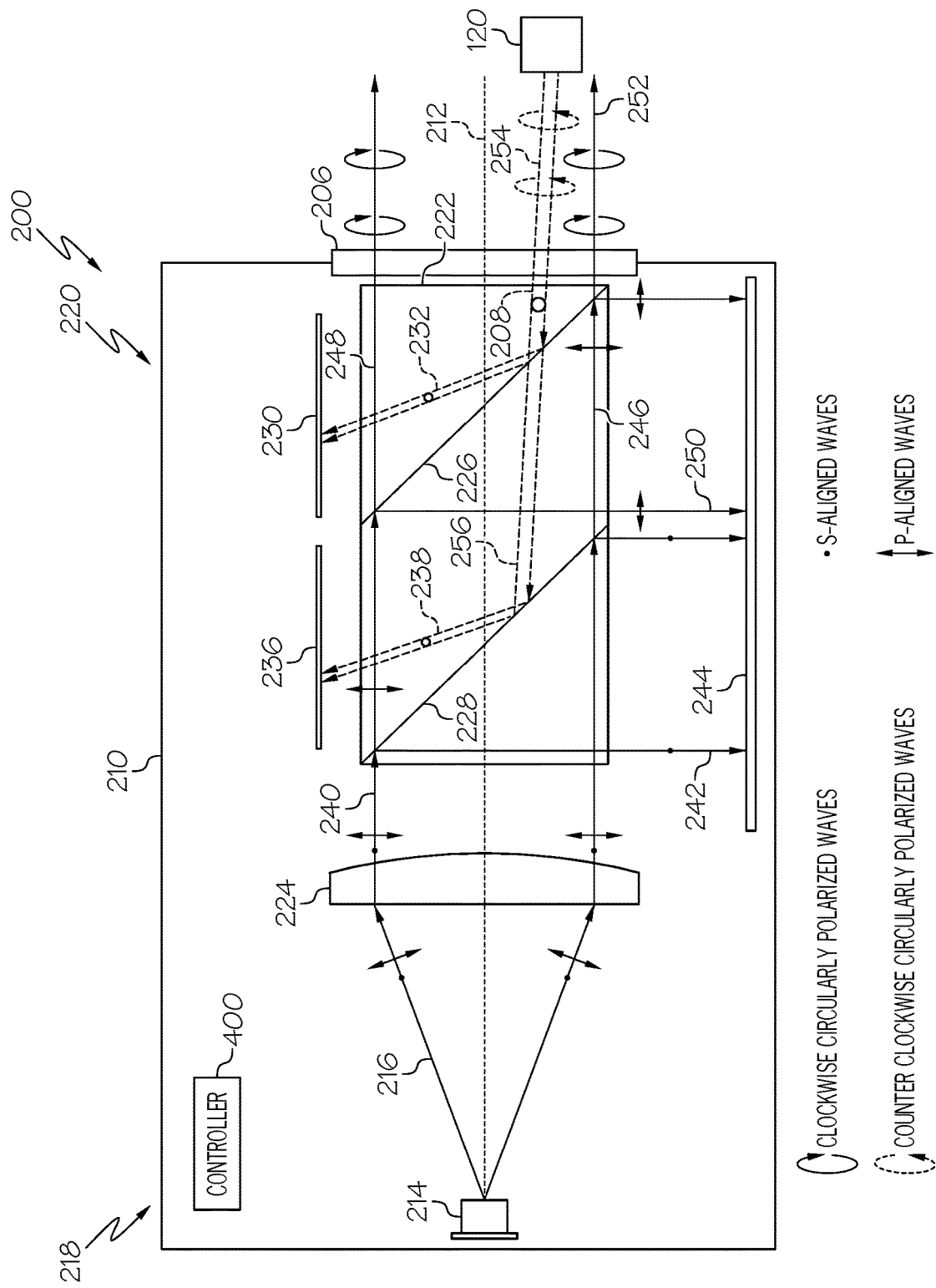
FIG. 8 is a side schematic view of an example camera system useful in the bore metrology system of FIG. 1.

In an example, the bore metrology system 100 includes a camera system 200 mounted on the end effector 302. The camera system 200 may be in communication with the controller 400. As shown in FIG. 6A, the camera system 200 may be configured to project a collimated beam 204 of electromagnetic radiation within a field of view 202. With reference to FIG. 8, camera system 200 may include a housing 210 having a boresight centerline 212. The camera system 200 may further include a beam generator 214 configured to project a beam 216 proximate a first end 218 of the housing 210 along the boresight centerline 212. In an example, the camera system 200 includes a quarter wave plate 222 proximate a second end 220 of the housing 210 along the boresight centerline 212. A collimating optic 224 may be disposed between the beam generator 214 and the quarter wave plate 222 along the boresight centerline 212. In an example, a beam-splitting half-mirror surface 226 is arranged at an angle relative to the boresight centerline 212 and positioned between the collimating optic 224 and the quarter wave plate 222. In an example, a linear polarizing surface 228 is arranged at an angle relative to the boresight centerline 212 and positioned between the collimating optic 224 and the beam-splitting half-mirror surface 226. In an example, the camera system 200 includes a first sensor 230 configured to receive a first input beam 232 reflected from the beam-splitting half-mirror surface 226 and a second sensor 236 configured to receive a second input beam 238 reflected from the linear polarizing surface 228.

The controller 400 may be configured to determine a centerline 106 of the initial bore 104 based on a reflection of the collimated beam 204 of the electromagnetic radiation from the optical target 122 through the pilot bore 114. In an example, the camera system 200 is configured to form an image of the reflector portion 124a of the reflector 124 and the pattern portion 128a of the pattern 128 that are visible through the pilot bore 114. The camera system 200 may further be configured such that the controller 400 is a part of the camera system 200. In an example, the controller 400 is configured to determine a centerline 106 of the initial bore 104 based on the formed image. In an example, illustrated in FIG. 9A, the bore metrology system 100 further includes a boring spindle 500 mounted on the end effector 302 at a pre-determined orientation relative to the camera system 200.

Figure 4B:
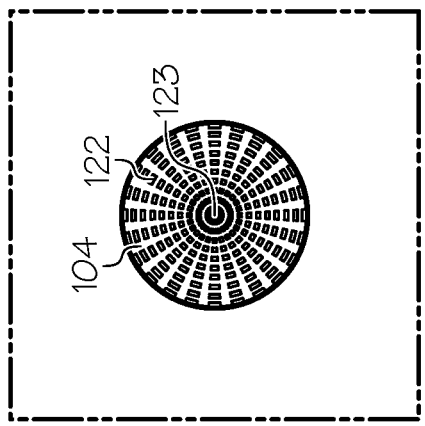
FIGS. 4A and 4B are detailed front views of a first structure of the system of FIG. 1, shown with a bore locating target assembly inserted into an initial bore in the first structure.
Figure 4A:
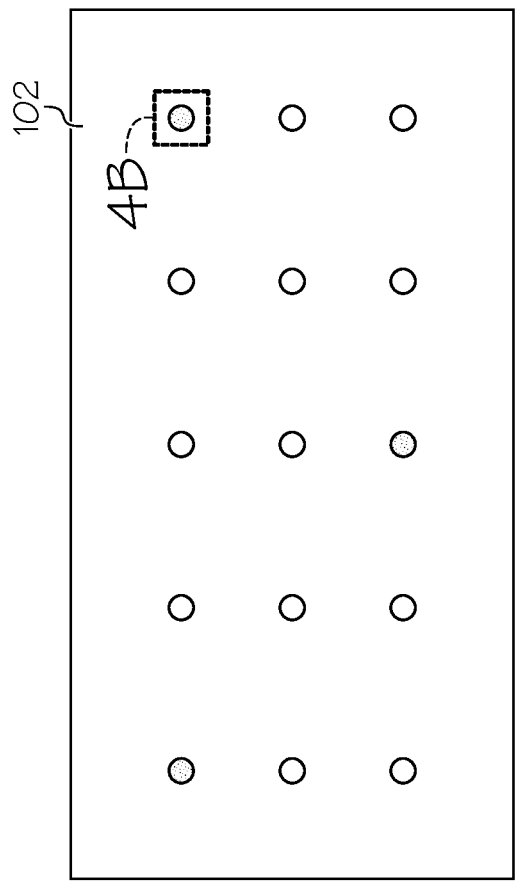

FIGS. 4A and 4B illustrate a detailed front view of a first structure 102 of the bore metrology system 100, shown with a bore locating target assembly 120 inserted into an initial bore 104 in the first structure 102. The bore locating target assembly 120 may further include a self-centering insert 130 defining a self-centering insert centerline 132 and including a distal end 134 and a proximal end 136. The optical target 122 may further be connected proximate the distal end 134 of the self-centering insert 130. In an example, the optical target 122 defines an outer surface 133. In an example, the outer surface 133 of the optical target 122 is substantially perpendicular to the self-centering insert centerline 132.

In an example, multiple holes may include a bore locating target assembly 120. Given that the full size hole pattern can be machined with precision, in an example not all the holes include a bore locating target assembly 120. FIG. 4A illustrates three of the bore locating target assembly 120. However, more or fewer of the bore locating target assembly 120 are possible.

In an example, the self-centering insert 130 includes a shaft 140 defining the self-centering insert centerline 132 and including a distal end portion 142 and a proximal end portion 144. The self-centering insert 130 further including a flange 146 proximate the distal end portion 142 of the shaft 140, a nut 148 threaded into engagement with the proximal end portion 144 of the shaft 140, and a radially expandable bushing 150 received over the shaft 140 and positioned between the flange 146 and the nut 148. In an example, axial compression of the radially expandable bushing 150 along the self-centering insert centerline 132 causes corresponding radial expansion of the radially expandable bushing 150.

In an example, a bore locating target assembly 120 is disclosed and illustrated in FIG. 2. The bore locating target assembly 120 may include a self-centering insert 130. Self-centering insert 130 may define a self-centering insert centerline 132 and include a distal end 134 and a proximal end 136. In an example, as illustrated in FIG. 3, the self-centering insert 130 includes a radially expandable bushing 150 configured to center the self-centering insert 130 within a bore when the self-centering insert 130 is inserted into a bore. The radially expandable bushing 150 may be configured to radially expand in response to axial compression. The bore locating target assembly 120 may further include an optical target 122 connected proximate the distal end 134 of the self-centering insert 130. The optical target 122 may define an outer surface 133. In an example, the outer surface 133 of optical target 122 is substantially perpendicular to the self-centering insert centerline 132. In another example, the outer surface 133 of the optical target 122 is substantially planar.

In an example, the optical target 122 includes a reflector 124 and an optical absorbing feature 126. The reflector 124 may include a silver coated surface. The optical absorbing feature 126 may include one or more of an etch, an ink, and a carbon-containing compound, or any combination thereof. The optical absorbing feature 126 may define a pattern 128 on the optical target 122. In an example, the pattern 128 on the optical target 122 is a polar reticle.

In an example, the self-centering insert 130 includes a shaft 140. Shaft 140 may define the self-centering insert centerline 132. In an example, shaft 140 includes a distal end portion 142 and a proximal end portion 144. The shaft 140 may include a flange 146 proximate the distal end portion 142 of the shaft 140. A nut 148 may be threaded into engagement with the proximal end portion 144 of the shaft 140. In an example, the shaft 140 includes a radially expandable bushing 150. The radially expandable bushing 150 may be configured to be received over the shaft 140 and positioned between the flange 146 and the nut 148 such that axial compression of the radially expandable bushing 150 along the self-centering insert centerline 132 causes corresponding radial expansion of the radially expandable bushing 150.

As mentioned above, the camera system 200 may be configured to project a collimated beam 204 of electromagnetic radiation within field of view 202. FIG. 8 illustrates an exemplary camera system 200 that is configured to project an output beam (e.g., collimated beam 204) to be reflected back to the camera system 200 as an input beam, in accordance with example embodiments. As seen in FIG. 8, camera system 200 includes a housing 210 defining a boresight centerline 212. Housing 210 may define an aperture 206 to receive a collimated input beam 208. In an example, the camera system 200 includes an optical boresight having a boresight centerline 212, a first sensor 230 and a second sensor 236 serially positioned relative to the boresight centerline 212 of the optical boresight, a beam-splitting half-mirror surface 226 including a beam splitter configured to split the collimated input beam 208 into a first input beam 232 and a second input beam 238, and direct the first input beam 232 of the collimated input beam 208 to the first sensor 230. The camera system 200 may further include a linear polarizing surface 228 including a reflective surface configured to reflect the second input beam 238 and direct second input beam 238 to the second sensor 236

The camera system 200 may further include a controller 400 in communication with the first sensor 230 and the second sensor 236, controller 400 configured to monitor the camera system 200 and determine one or more offsets of the collimated input beam 208 from the boresight centerline 212 based on data received from the first sensor 230 and the second sensor 236. The controller 400 in communication with the first sensor 230 and the second sensor 236 of the camera system 200 may be contained within the camera system 200 housing 210 or outside the housing 210.

In an example, the camera system 200 is configured to project an output beam to be reflected back to the camera system 200 as the collimated input beam 208. FIG. 8 illustrates a camera system that includes a beam generator 214 configured to project a randomly polarized beam 216, which includes S-aligned waves and P-aligned waves, to a collimating optic 224. Collimating optic 224 directs a collimated output beam 240 through the camera system 200. The collimated output beam 240 passes through a linear polarizing P-pass coating of linear polarizing surface 228. In doing so, a portion of the collimated output beam 240, namely the S-aligned waves of the beam, are reflected along first beam path 242 to a beam dump 244. The beam dump 244 merely absorbs the waves without reflecting the received beams back into the optics of the camera system 200 which could affect accuracy of the measurements and data collected.

The portion of the collimated output beam 240 that passes through the linear polarizing P-pass coating of the linear polarizing surface 228 includes P-aligned waves of the beam 246. A portion of the P-aligned waves of beam 246 pass through beam-splitting half-mirror surface 226 as output beam 248, while another portion of beam 246 is split and directed along path 250 to the beam dump 244. The remaining output beam 248 then passes through a quarter wave plate 222, which causes the output beam from the camera system 200 to be a clockwise circularly polarized wave output beam 252 exiting the camera system 200, directed toward bore locating target assembly 120. Within examples, the circularly polarized wave output beam 252 corresponds to the collimated beam 204 shown in FIGS. 6A-6B.

The clockwise circularly polarized wave output beam 252 is considerably more broad than the bore locating target assembly 120 as the bore locating target assembly 120 includes a very small, reflective surface. The bore locating target assembly 120 of an example embodiment is on the order of millimeters or fractions thereof, while the clockwise circularly polarized wave output beam 252 may be an order of magnitude larger or more. The bore locating target assembly 120 reflects a small portion of the clockwise circularly polarized wave output beam 252 back to the camera system 200. The reflected beam from the bore locating target assembly 120 becomes the target input beam 254 to the camera system 200. The target input beam 254, as it is reflected from the clockwise circularly polarized wave output beam 252, becomes counter-clockwise circularly polarized. The target input beam 254 passes through the quarter wave plate 222, which causes the counter-clockwise circularly polarized wave to become S-aligned, substantially cancelling the circular polarization imparted to the clockwise circularly polarized wave output beam 252 by the quarter wave plate 222. The S-aligned collimated input beam 208 strikes the beam-splitting half-mirror surface 226, from which the beam is split and a portion of the beam or first input beam 232 is reflected to first sensor 230. The portion of the beam 256 that passes through the beam-splitting half-mirror surface 226 reaches the polarizing P-pass coating of linear polarizing surface 228. As the input beam becomes S-aligned from entering the camera system 200 through the quarter wave plate 222, the S-aligned beam of beam 256 is reflected in its entirety off of the P-pass coating of linear polarizing surface 228 as second input beam 238 to reach the second sensor 236.

The camera system 200 illustrated in the exemplary embodiment shown in FIG. 8 uses the sensed data of the first sensor 230 and the second sensor 236 to establish the translation offsets of the collimated input beam 208 from the boresight centerline 212 and angle offsets of the collimated input beam 208 from the boresight centerline 212.

According to some embodiments, at least one of the first sensor 230 and second sensor 236 is a pixelated imager with the beam splitting reflective surfaces appropriately spaced. Another of the first sensor 230 and second sensor 236 of an example embodiment is a time-of-flight pixelated sensor with the beam splitting reflective surfaces appropriately spaced. The output from the time-of-flight pixelated sensor is provided to a controller 400 of the camera system 200, where three-dimensional time-of-flight sensor electronics may be used to determine a distance of the bore locating target assembly 120 from the camera system 200. The three-dimensional time-of-flight sensor electronics may be in communication with or in control of the beam 216 such that time-of-flight of the beam 216 is calculated through modulation of the collimated output beam 240 and processing of the reflected collimated input beam 208. While using at least one of the first sensor 230 or the second sensor 236 as a pixelated imager with the beam splitting surfaces appropriately spaced provides for determination of five degrees of freedom of the bore locating target assembly 120, incorporating the time-of-flight pixelated sensor with three-dimensional time-of-flight sensor electronics provides for determination of the z-axis offset or distance of the camera system 200 from the bore locating target assembly 120. Factoring in the z-axis offset with the x- and y-axis offsets identified above, and using the three angular offsets of the three mutually orthogonal axes provides for accurate measurement of six degrees of freedom of the bore locating target assembly 120. Incorporating time-of-flight to establish the z-axis offset requires additional calculations.

While the exemplary embodiment shown in FIG. 8 includes linearly arranged optics, alternative embodiments may be made of a more compact form factor, including a form factor in which the aperture is at an angle with respect to the boresight centerline 212.

Figure 10:
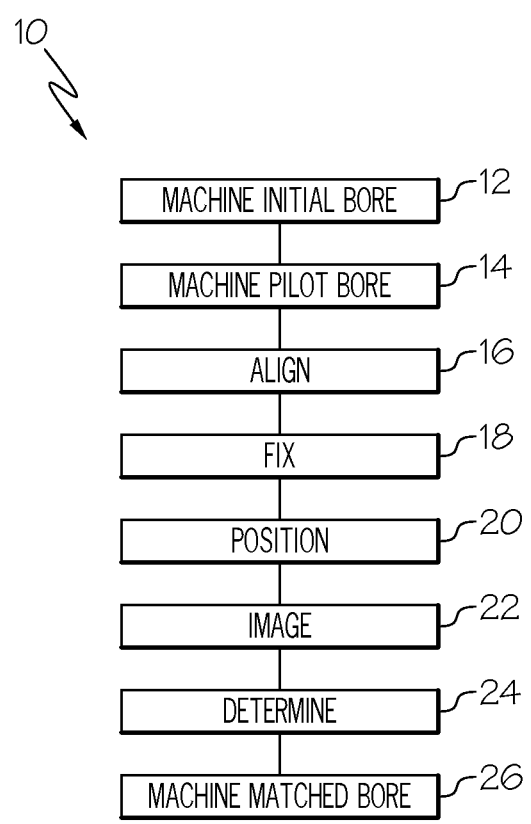
FIG. 10 is a flow diagram of one example of the disclosed bore metrology method.

FIG. 10 illustrates a flow diagram of one example of the disclosed bore metrology method 10. In an example, the bore metrology method 10 includes positioning 20 a bore locating target assembly 120 within an initial bore 104. The bore locating target assembly 120 may include a self-centering insert 130. Self-centering insert 130 may define a self-centering insert centerline 132. The bore locating target assembly 120 may further include a distal end 134 and a proximal end 136.

In an example, the bore metrology method 10 includes aligning 16 a first structure 102 with a second structure 112. First structure 102 defines the initial bore 104. Initial bore 104 may be cylindrical in shape. Initial bore 104 may have a first diameter $D_1$. First structure 102 may include any material suitable for structural integrity and material properties necessary for its intended purpose including a metallic material. Aligning 16 may occur automatically via instructions from controller 400.

Figure 5B:
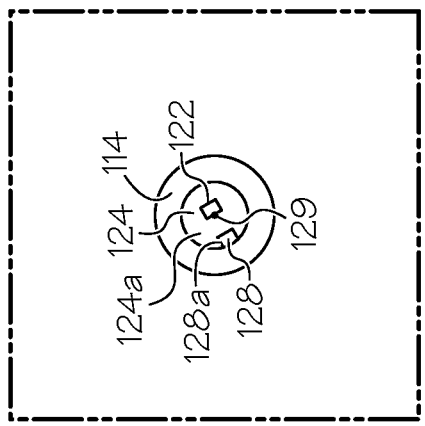
FIGS. 5A and 5B are detailed front views of a second structure of the system of FIG. 1, shown with the second structure positioned over and aligned with the first structure such that the bore locating target assembly in the first structure is partially visible through a pilot bore in the second structure.
Figure 5A:
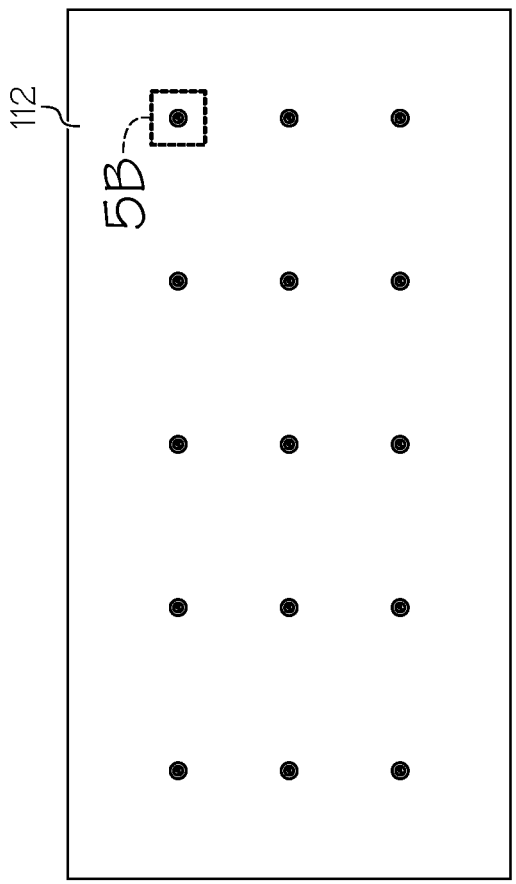

FIGS. 5A and 5B illustrate a detailed front view of second structure 112 of the bore metrology system 100, shown with the second structure 112 positioned over and aligned with the first structure 102 such that the bore locating target assembly 120 in the first structure 102 is partially visible through a pilot bore 114 in the second structure 112. In an example, second structure 112 defines a pilot bore 114 such that the initial bore 104 of first structure 102 is partially obstructed by the second structure 112 and the pilot bore 114 is superimposed with the initial bore 104. Pilot bore 114 may be cylindrical in shape. Pilot bore 114 may have a second diameter $D_2$. In an example, second diameter $D_2$ is smaller than the first diameter $D_1$ such that it has a smaller diameter than $D_1$. Second structure 112 may include any material suitable for structural integrity and material properties necessary for its intended purpose including a fiber-reinforced composite material. Positioning 20 the bore locating target assembly 120 within the initial bore 104 may occur before aligning 16 the first structure 102 with the second structure 112 or after aligning 16 the first structure 102 with the second structure 112.

The initial bore further includes a bore locating target assembly 120 within the initial bore 104. In an example, the bore locating target assembly 120 further includes an optical target 122. In an example, the optical target 122 is connected proximate the distal end 134 of the self-centering insert 130 of bore locating target assembly 120. In an example, the optical target 122 defines an outer surface 133. The outer surface 133 of the optical target 122 may be substantially perpendicular to the self-centering insert centerline 132. The optical target 122 may further include a reflector 124 and an optical absorbing feature 126.

Figure 6B:
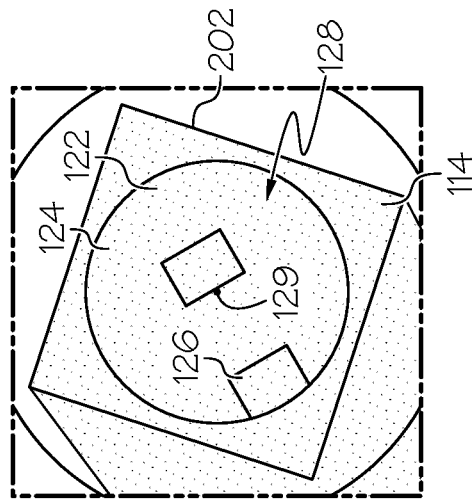
FIGS. 6A and 6B are detailed views of a portion of the system of FIG. 1, depicting a camera system imaging a portion of the bore locating target assembly that is visible through the pilot bore in the second structure.
Figure 6A:
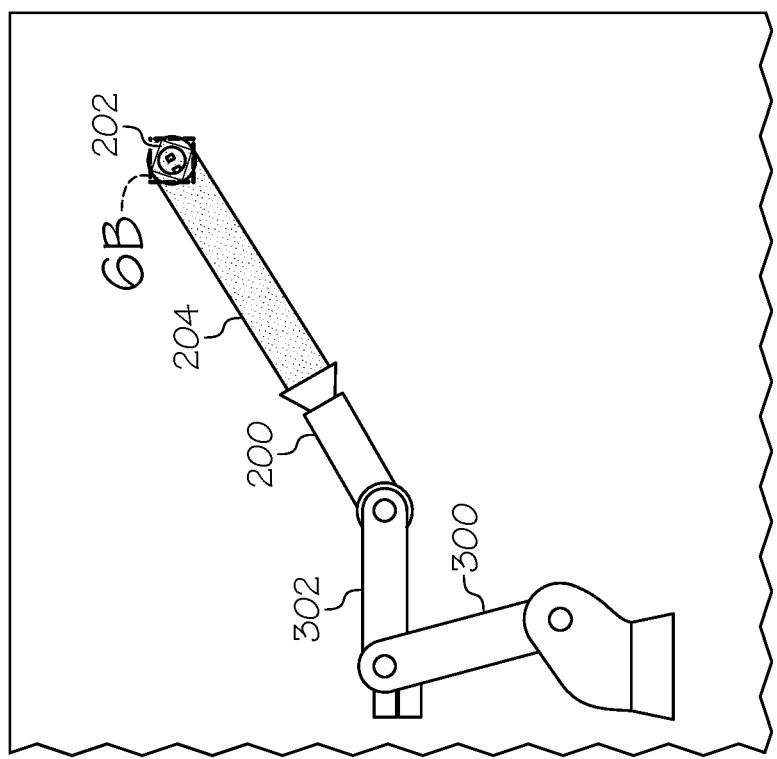

FIGS. 6A and 6B illustrate a detailed view of a portion of the bore metrology system 100, depicting camera system 200 imaging a portion of the bore locating target assembly 120 that is visible through the pilot bore 114 in the second structure 112. The optical absorbing feature 126 may be configured to define a pattern 128 on the optical target 122. For example, the pattern 128 may be a polar reticle or the like. In an example, at least a reflector portion 124a of the reflector 124 and at least a pattern portion 128a of the pattern 128 defined on the optical target 122 are visible through the pilot bore 114. Reflector 124 may include a silver coated polished surface (e.g., mirror) or any other material suitable for reflection. In an example, the optical absorbing feature 126 includes one or more of an etch, an ink, and a carbon-containing compound, or any combination thereof.

Figure 7:
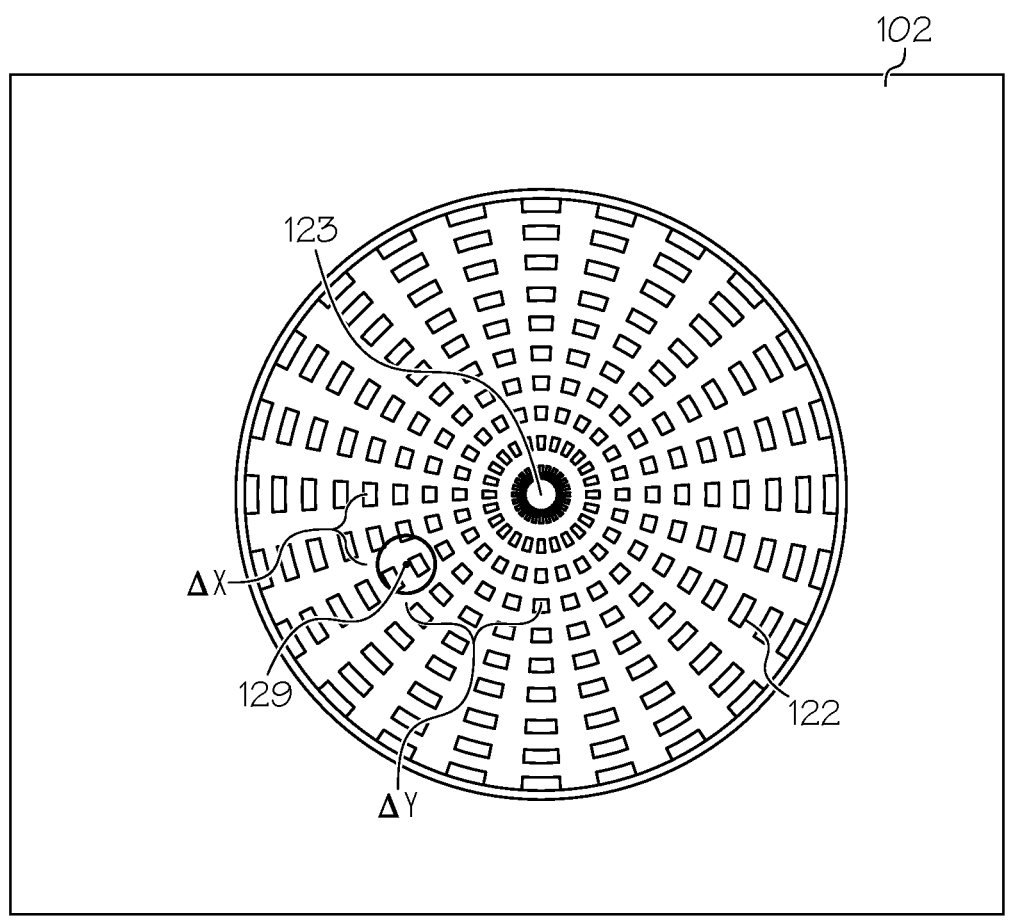
FIG. 7 is a further detailed view of a portion of the system of FIG. 1, depicting a location of the pilot bore vis-a-vis the bore locating target assembly in the initial bore.

FIG. 7 illustrates a detailed view of a portion of the bore metrology system 100, depicting a location of the pilot bore 114 vis-a-vis the bore locating target assembly 120 in the initial bore 104. In an example, the bore metrology method 10 further includes imaging 22 the reflector portion 124a of the reflector 124 and the pattern portion 128a of the pattern 128 that are visible through the pilot bore 114. Data captured during imaging 22 may be communicated to a controller 400 for analysis. The bore metrology method 10 further includes determining 24 a centerline 106 of the initial bore 104 based on the imaging 22. Determining 24 may be performed by controller 400. The determining 24 the centerline 106 of the initial bore 104 may include determining an angular orientation of the initial bore 104.

In an example, the bore metrology method 10 may further include machining 12 (FIG. 10) the initial bore 104 in the first structure 102. The machining 12 of the initial bore 104 may be performed prior to the aligning 16 using a machining tool, such as a mill end or the like. The machining 12 of the initial bore 104 may be performed at the same location as the aligning 16 or at a different location.

In an example, the bore metrology method 10 may further include machining 14 (FIG. 10) the pilot bore 114 in the second structure 112. The machining 14 of the pilot bore 114 may be performed prior to the aligning 16 using a machining tool, such as a mill end or the like. The machining 14 of the pilot bore 114 may be performed at the same location as the aligning 16 and/or the machining 12, or at a different location.

In an example, the bore metrology method 10 may further include fixing 18 the first structure 102 relative to the second structure 112. Fixing 18 may occur after aligning 16 the first structure 102 with the second structure 112. In an example, the imaging 22 may include positioning a camera system 200 having a field of view 202 such that the pilot bore 114 is within the field of view 202. In an example, the imaging 22 may include projecting a collimated beam 204 of electromagnetic radiation onto the reflector portion 124a of the reflector 124 and the pattern portion 128a of the pattern 128 that are visible through the pilot bore 114. Positioning the camera system 200 may be performed by an automated machine 300. The determining 24 the centerline 106 of the initial bore 104 may include determining a surface vector V of the optical target 122 based on specular reflection of the collimated beam 204 of the electromagnetic radiation from the optical target 122.

In an example, the self-centering insert 130 further includes a shaft 140. Shaft 140 may define the self-centering insert centerline 132 and may further include a distal end portion 142 and a proximal end portion 144. The self-centering insert 130 may further include a flange 146 proximate the distal end portion 142 of the shaft 140. In an example, the self-centering insert 130 includes a nut 148 threaded into engagement with the proximal end portion 144 of the shaft 140. The self-centering insert 130 may include a radially expandable bushing 150 that may be received over the shaft 140 and may further be positioned between the flange 146 and the nut 148. In an example, axial compression of the radially expandable bushing 150 along the self-centering insert centerline 132 may cause corresponding radial expansion of the radially expandable bushing 150.

In an example, the determining 24 the centerline 106 of the initial bore 104 includes determining a two-dimensional coordinate location of a center 129 of a portion of the optical target 122 that is visible through the pilot bore 114. In an example, the determining 24 further includes determining translational offsets corresponding to a difference between the two-dimensional coordinate location of the center 129 of the portion of the optical target 122 that is visible through the pilot bore 114 and a two-dimensional coordinate location of a center 123 of the optical target 122. FIG. 7 illustrates a difference between an X-coordinate location of center 129 and an X-coordinate location of center 123, as well as a difference between a Y-coordinate location of center 129 and a Y-coordinate location of center 123. The determining the two-dimensional coordinate location of the center 129 of the portion of the optical target 122 that is visible through the pilot bore 114 may include applying a pattern matching algorithm to the portion of the optical target 122 that is visible through the pilot bore 114. A controller 400 may be utilized to apply a pattern matching algorithm to the portion of the optical target 122 that is visible through the pilot bore 114.

Figure 9B:
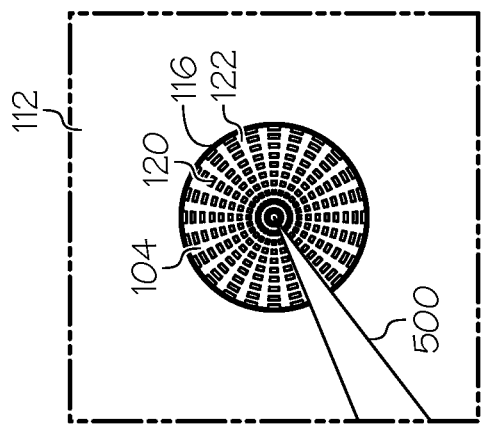
FIGS. 9A and 9B are detailed views of a portion of the system of FIG. 1, depicting a boring spindle machining a matched bore in the second structure.
Figure 9A:
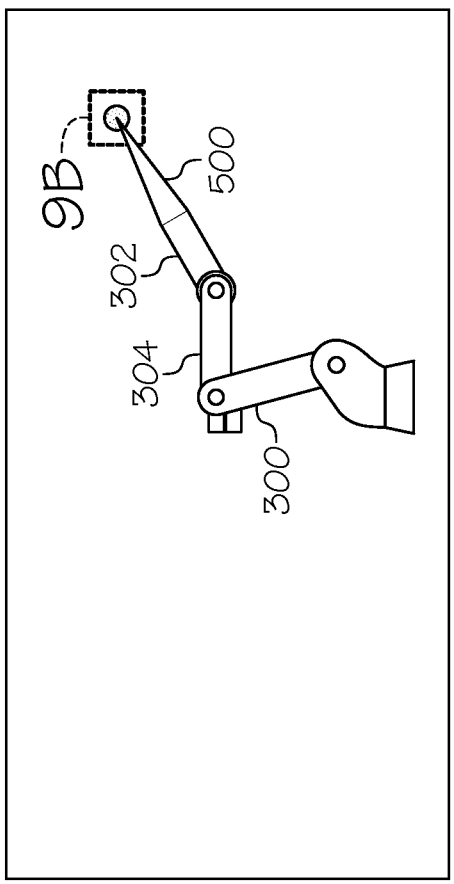

The bore metrology method 10 may further include machining 26 a matched bore 116 in the second structure 112 along the centerline 106 of the initial bore 104. The machining 26 may be performed using the boring spindle 500 shown in FIGS. 9A and 9B, or like apparatus. In an example, the machining 26 of the matched bore 116 in the second structure 112 further includes machining the second structure 112 without contacting the first structure 102. FIG. 9B shows the boring spindle 500 drill location for when boring spindle 500 drills matched bore 116 in the second structure 112. For illustrative purposes, portions of the second structure 112 are transparent so that the center of optical target 122 can be seen.

Figure 11:
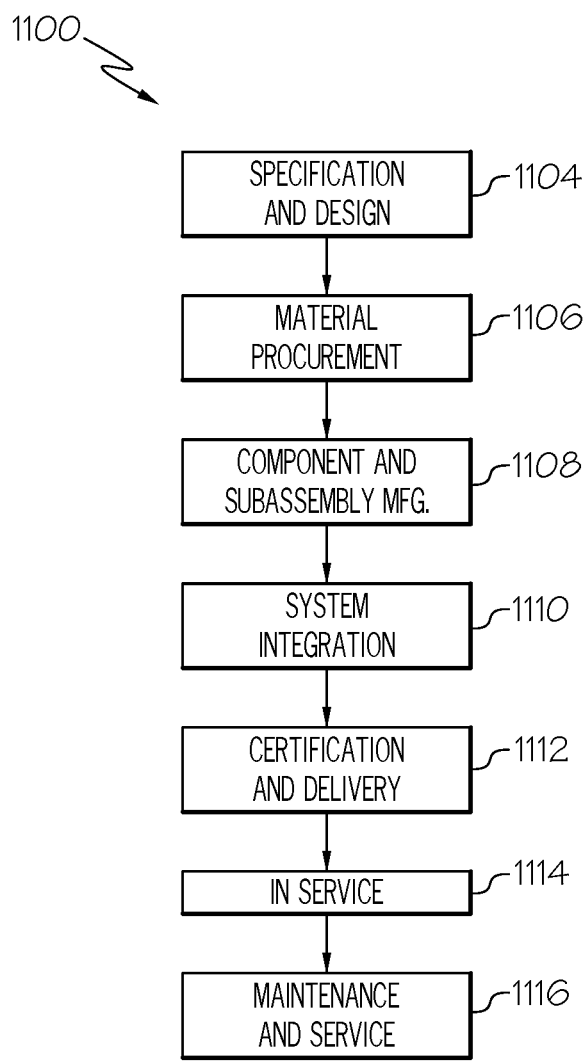
FIG. 11 is a flow diagram of an aircraft manufacturing and service methodology.
Figure 12:
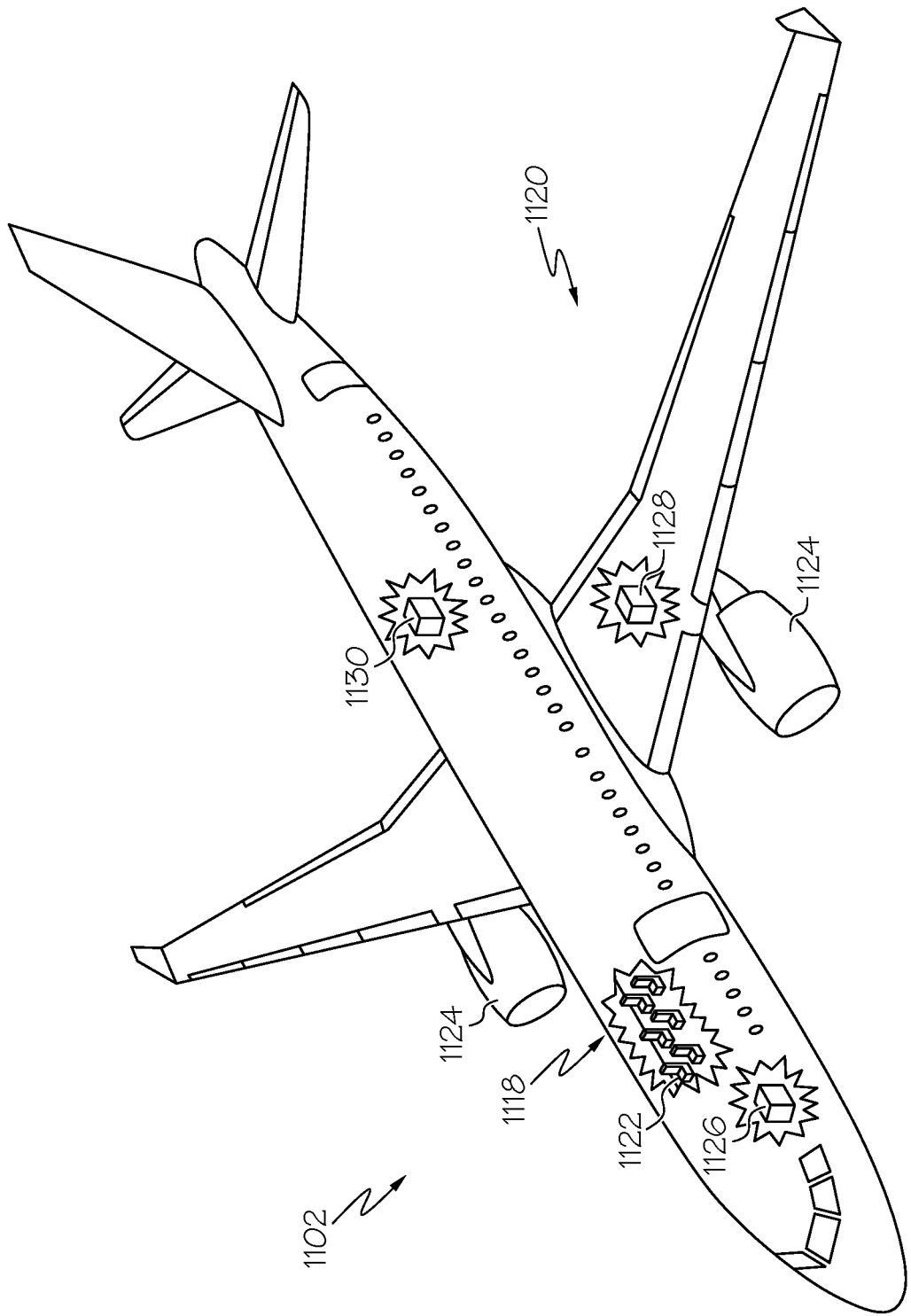
FIG. 12 is a perspective view of an aircraft benefiting from the disclosed bore metrology methods and systems.

FIG. 11 is a flow diagram of an aircraft manufacturing and service methodology. Examples of the disclosure may be described in the context of an aircraft manufacturing and service method 1100, as shown in FIG. 11, and an aircraft 1102, as shown in FIG. 12. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the steps of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

FIG. 12 is a perspective view of an aircraft benefiting from the disclosed bore metrology methods and systems. As shown in FIG. 12, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems that may be used to manufacture an aircraft or aircraft component in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

Although various examples of the disclosed bore metrology methods and systems, and bore locating target assemblies for use therewith have been shown and described, modifications may occur to those skilled in the art upon reading the specification. The present application includes such modifications and is limited only by the scope of the claims.

What is claimed is:

1. A bore metrology method comprising:
    aligning a first structure, which defines an initial bore, with a second structure, which defines a pilot bore, such that the initial bore is partially obstructed by the second structure and the pilot bore is superimposed with the initial bore, wherein the initial bore comprises a bore locating target assembly within the initial bore, the bore locating target assembly comprising an optical target, the optical target comprising a reflector and an optical absorbing feature, the optical absorbing feature defining a pattern on the optical target, wherein at least a reflector portion of the reflector and at least a pattern portion of the pattern are visible through the pilot bore;
    imaging the reflector portion of the reflector and the pattern portion of the pattern that are visible through the pilot bore; and
    determining a centerline of the initial bore based on the imaging.

2. The bore metrology method of claim 1 further comprising positioning the bore locating target assembly within the initial bore.

3. The bore metrology method of claim 2 wherein the positioning the bore locating target assembly within the initial bore occurs before the aligning the first structure with the second structure.

4. The bore metrology method of claim 1 wherein the initial bore is a cylindrical bore having a first diameter and the pilot bore has a second diameter, and wherein the second diameter is less than the first diameter.

5. The bore metrology method of claim 1 further comprising, after the aligning, fixing the first structure relative to the second structure.

6. The bore metrology method of claim 1 wherein the reflector comprises a silver coated polished surface.

7. The bore metrology method of claim 1 wherein the optical absorbing feature comprises at least one of an etch, an ink, and a carbon-containing compound.

8. The bore metrology method of claim 1 wherein the pattern comprises a polar reticle.

9. The bore metrology method of claim 1 wherein the bore locating target assembly further comprises a self-centering insert defining a self-centering insert centerline and comprising a distal end and a proximal end, and wherein the optical target is connected proximate the distal end of the self-centering insert.

10. The bore metrology method of claim 9 wherein the optical target defines an outer surface, and wherein the outer surface of the optical target is substantially perpendicular to the self-centering insert centerline.

11. The bore metrology method of claim 9 wherein the self-centering insert further comprises:
    a shaft defining the self-centering insert centerline and comprising a distal end portion and a proximal end portion;
    a flange proximate the distal end portion of the shaft;
    a nut threaded into engagement with the proximal end portion of the shaft ; and
    a radially expandable bushing received over the shaft and positioned between the flange and the nut, wherein axial compression of the radially expandable bushing along the self-centering insert centerline causes corresponding radial expansion of the radially expandable bushing.

12. The bore metrology method of claim 1 wherein the imaging comprises positioning a camera system having a field of view such that the pilot bore is within the field of view.

13. The bore metrology method of claim 12 wherein the positioning the camera system is performed by an automated machine.

14. The bore metrology method of claim 1 wherein the imaging comprises projecting a collimated beam of electromagnetic radiation onto the reflector portion of the reflector and the pattern portion of the pattern that are visible through the pilot bore.

15. The bore metrology method of claim 14 wherein the determining the centerline of the initial bore comprises determining a surface vector of the optical target based on specular reflection of the collimated beam of the electromagnetic radiation from the optical target.

16. The bore metrology method of claim 1 wherein the determining the centerline of the initial bore comprises:
    determining a two-dimensional coordinate location of a center of a portion of the optical target that is visible through the pilot bore; and
    determining translational offsets corresponding to a difference between the two-dimensional coordinate location of the center of the portion of the optical target that is visible through the pilot bore and a two-dimensional coordinate location of a center of the optical target.

17. The bore metrology method of claim 16 wherein the determining the two-dimensional coordinate location of the center of the portion of the optical target that is visible through the pilot bore comprises applying a pattern matching algorithm to the portion of the optical target that is visible through the pilot bore.

18. The bore metrology method of claim 1 wherein the determining the centerline of the initial bore comprises determining an angular orientation of the initial bore.

19. A bore metrology system comprising:
 a bore locating target assembly positionable within an initial bore defined in a first structure, wherein the initial bore is partially obstructed by a second structure defining a pilot bore, wherein the pilot bore is superimposed with the initial bore, the bore locating target assembly comprising an optical target, the optical target comprising a reflector and an optical absorbing feature, wherein the optical absorbing feature defines a pattern on the optical target;
 an automated machine comprising an end effector; and
 a camera system mounted on the end effector, the camera system being configured to project a collimated beam of electromagnetic radiation within a field of view,
 wherein the automated machine is configured to position the end effector such that the pilot bore is within the field of view.

20. A bore locating target assembly comprising:
 a self-centering insert defining a self-centering insert centerline and comprising a distal end and a proximal end; and
 an optical target connected proximate the distal end of the self-centering insert, wherein the optical target comprises a reflector and an optical absorbing feature, and wherein the optical absorbing feature defines a pattern on the optical target.

* * * * *